United States Patent [19]
Volkmann et al.

[11] 3,761,947
[45] Sept. 25, 1973

[54] DISPLAY CONVERTER FOR RECORDING MULTIPLICITY OF OSCILLOSCOPE TRACES

[75] Inventors: Klaus Volkmann, Reutlingen-Sodelfingen; Rudolf Dick, Eningen u.a., both of Germany

[73] Assignee: Wandel u. Goltermann K.G., Muhleweg, Germany

[22] Filed: Sept. 11, 1972

[21] Appl. No.: 288,097

[30] Foreign Application Priority Data
Sept. 9, 1971   Germany................... P 21 45 034.0

[52] U.S. Cl..................... 346/33 R, 346/29, 346/23
[51] Int. Cl. ............................................. G01d 5/00
[58] Field of Search................. 346/33 R, 33 A, 17, 346/29, 23, 44

[56] References Cited
UNITED STATES PATENTS
2,895,784   7/1959   Rocha............................ 346/33 EC
3,001,847   9/1961   Kerns................................ 346/33 A Primary Examiner—Joseph W. Hartary
Attorney—Karl F. Ross et al.

[57] ABSTRACT

An oscilloscope, serving to display the traces of different output voltages of a test circuit representing at least two circuit parameters (amplitude and phase) in various test-frequency bands, is coupled to a graphic recorder through a converter including a source of triangular sweep voltage for the x-deflection of the stylus of the recorder. The cadence of this sweep voltage is substantially lower than that of a triangular scanning voltage (wobble frequency) serving for the exploration of each band, a comprator in the converter generating a coincidence signal upon detecting a match between the two triangular frequencies to pass a sample of the output voltage for deflecting the stylus in the y-direction. Whenever the monotonically varying sweep voltage over- or undershoots the range of the scanning voltage derived from the oscilloscope input, the prolonged absence of the coincidence signal gives rise in the converter to an end-of-sweep signal which, upon every third occurrence, causes a switchover to a different parameter and/or frequency band. The switchover in the oscilloscope input is accompanied by a modification of the basic horizontal and/or vertical control voltage for the stylus so that the new trace is inscribed on a different portion of the paper sheet serving as a recording medium. Each recording cycle includes a high-speed first period for the registration of an upper reference line, a low-speed second period for the inscription of the trace and a high-speed third period for the registration of a lower reference line.

18 Claims, 3 Drawing Figures

DISPLAY CONVERTER FOR RECORDING MULTIPLICITY OF OSCILLOSCOPE TRACES

FIELD OF THE INVENTION

Our present invention relates to a display converter designed to make a permanent record of traces electronically projected upon a screen of a cathode-ray tube.

BACKGROUND OF THE INVENTION

A conventional display converter of this character, described in a brochure entitled CRT DISPLAY CONVERTERS and published by Pacific Measurements Incorporated of Palo Alto, CA with the identification PM 1001-1005-7-69, comprises a graphic recorder having two conjugate inputs for displacing a writing implement such as a pen or a stylus across a recording medium such as a strip of graph paper. One input of the recorder, which for reference purposes may be termed the "horizontal" or "x" input, receives a periodic sweep voltage whose frequency is low compared with the frequency of the oscilloscope scan in the same direction; thus, the beam of the cathode-ray tube sweeps many times horizontally across the oscilloscope screen while the pen executes a single stroke across the assigned writing area of the graph paper. Whenever the two sweep voltages bear a predetermined relationship indicating that the beam and the pen are in corresponding positions along the abscissa (in terms of fractions of the overall stroke) with reference to the origin of the co-ordinate system, a comparator opens a sampling gate to supply to the "vertical" or "y" input of the recorder a signal proportional to the vertical deflection of the beam, thereby placing the pen of the recorder in a corresponding position along the ordinate. In this way, in a succession of coincidences of the "x" positions of the beam and the pen, a recurrent trace seemingly stationary on the oscilloscope screen is faithfully reproduced on the recording medium with a degree of resolution depending upon the ratio of the two horizontal sweeps.

OBJECTS OF THE INVENTION

The general object of our present invention is to provide a system of this type enabling the recording, in rapid succession, of two or more traces resulting from modifications of the oscilloscope input.

A more specific object is to provide a system in which the traces to be recorded represent measurements of certain parameters of a transmission circuit or test pad, such as attenuation and/or phase angle, as determined in a number of frequency ranges.

SUMMARY OF THE INVENTION

These objects are realized, pursuant to our present invention, by including a supply of supplemental voltage in at least one of the two conjugate input circuits of the aforedescribed recorder whereby the writing implement can be shifted (horizontally and/or vertically) to a plurality of different areas of the recording medium, this shifting taking place concurrently with a switchover at the signal source feeding the vertical-deflection circuit of the cathode-ray tube. Naturally, the supplemental voltage producing the shift should be larger than the maximum voltage excursion in the corresponding direction ($x$ or $y$) during inscription of a single trace; thus, a number of such traces can be recorded in the assigned areas side by side and/or one above the other.

In accordance with a more particular object of our invention, the low-frequency sweep voltage applied to the horizontal recorder input is allowed to vary in a monotonic manner, i.e., to increase or decrease progressively, beyond the point which corresponds to the limit of the horizontal beam sweep whereupon no further coincidences can be detected by the comparator; the prolonged absence of coincidence signals from the comparator output empties a storage circuit of integrating character and gives rise to an end-of-sweep pulse. This end-of-sweep pulse may alert the operator to the fact that a trace has been fully recorded and that the switchover in the oscilloscope input and the activation (or deactivation) of the supplemental-voltage supply in the recorder input can take place to shift the writing implement to a different recording area. In the preferred embodiment described hereinafter, in which the system is fully automated, this switchover and shifting is carried out by a programmer in response to the end-of-sweep signal; in that case, a reversing input of the sweep-voltage generator is triggered to alternate between increasing and decreasing sweep voltages in response to successive end-of-sweep pulses.

If the recording medium is a graph paper and if the recorder is properly calibrated, the value of the deflecting voltage at each point of the inscribed curve may be determined directly from the magnitude of the ordinate. Since these conditions are not invariably fulfilled, an advantageous feature of our invention provides for the application of a predetermined reference voltage to the vertical recorder input—in lieu of a driving voltage derived from the vertical-sweep circuit of the oscilloscope—during certain intervals referred to hereinafter as OFF periods, in contradistinction to the ON periods in which a projected trace is being reproduced. In these OFF periods, therefore, the constant reference voltage holds the writing implement at a fixed distance from the abscissa to register a horizontal line, preferably across the entire writing area reserved for the associated trace; a lower and an upper voltage limit may be registered in this manner with the aid of two constant reference voltages during different OFF periods.

Thus, the numbers $n$ of horizontal pen strokes between switchovers may vary between 1 and 3, depending on whether no, one or two reference lines are to be recorded along with the trace; in principle, of course, $n$ could also be larger. In a three-stroke switching cycle, the first end-of-sweep pulse (or the actuation of a start switch at the beginning of operations) introduces a first OFF period during which the low-frequency sweep voltage at the $x$ input of the recorder varies monotonically in one sense, e.g., with ascending slope, across the entire sweep range for inscribing one of the two reference levels; the end of the first OFF period is marked by the next end-of-sweep pulse and coincides with the beginning of an ON period during which the trace on the oscilloscope screen is recorded by a reverse sweep of the pen. A further end-of-sweep pulse terminates the ON period and initiates a second OFF period during which the second reference level is inscribed, the pen again moving in the original forward direction. A certain interval must now be provided to permit the transport of the pen to its next writing area, advantageously with a return of the sweep voltage to the value it had at the start of the cycle so that the direction of pen motion in the three periods of the next cycle is the same as before.

After every nth end-of-weep pulse, therefore, a counter in the programmer emits a stop pulse to shift the pen and to switch frequency and/or parameters in the oscilloscope input. If the display converter is to be used in a system for measuring attenuation and phase angles in a test pad, e.g., as described in commonly owned U.S. Pat. No. 3,584,295, the oscilloscope input may be alternately switched by successive stop pulses to the outputs of an attenuation indicator and a phase meter with simultaneous shifting of the pen so that the attenuation curves are recorded on one side and the phase curves are recorded on the other side of the paper; after every two (or, more generally) $m$) stop pulses, a vertical shift takes place with selection of a new band of test frequencies, this procedure being repeated $p$ times for as many frequency bands to fill an array of $m \cdot p$ writing areas on the recording medium.

Advantageously, as known per se from the publication cited above, the recorder is provided with an ancillary ("pen-lift") input whose energization removes the writing implement from the recording medium to avoid unnecessary and confusing markings. In our present system, the programmer advantageously maintains this ancillary input energized not only in the short intervals of sweep reversal beyond the range limits but also during the fly-back stroke of the sweep voltage after the second OFF period, thus at the time when the pen is shifted to its starting point on the next-following writing area. This fly-back stroke may be of shorter duration (i.e., of larger absolute slope) than the forward strokes during the OFF periods which in turn are advantageously much shorter than the return stroke during the ON period; since the recording of a horizontal reference line does not require any degree of resolution, the acceleration of the sweep during these forward strokes saves time without sacrificing any information.

According to another feature of our invention, the sampling gate in the driving circuit for the vertical recorder input has an operating lead including an ancillary switch which is controlled by the programmer to make the closure of this gate independent of the occurrence or nonoccurrence of coincidence signals from the comparator during the OFF periods. For this purpose, the operating lead of the sampling gate is connected during each OFF period by the ancillary switch to a source of constant-cadence pulses which may be derived from the horizontal sweep voltage of the oscilloscope, e.g., through a differentiation circuit. With the sampling gate opening and closing in rapid succession, either periodically during OFF period or aperiodically (in response to the coincidence signals) during ON periods, the pulses traversing this gate are received in an accumulating network which may be an R/C integrator (similar to the aforementioned storage circuit for the coincidence signals) and whose time constant is preferably adjustable for most effective noise suppression. While the periodic sampling of an identically recurring signal has the effect of filtering some of the accompanying noise, additional noise suppression may be obtained by increasing this time constant to reduce the bandwidth. On the other hand, a reduction in the sweep frequency of the recorder increases the number of coincidence during a pen stroke and therefore enhances the degree of resolution, thereby further improving the signal-to-noise ratio. As this latter measure increases the bandwidth, the adjustment of the sweep frequency and that of the time constant of the accumulating network may be carried out simultaneously with opposite effects upon the bandwidth. Any such variation of the time constant of the accumulating network necessarily affects the relative magnitude of the input and output voltages of that network; since, however, the reference voltages pass through the same accumulator, the calibration of the record on the basis of the inscribed reference levels remains correct.

BRIEF DESCRIPTION OF THE DRAWING

The above and other features of our invention will now be described in detail with reference to the accompanying drawing in which.

SPECIFIC DESCRIPTION

Figure 1:
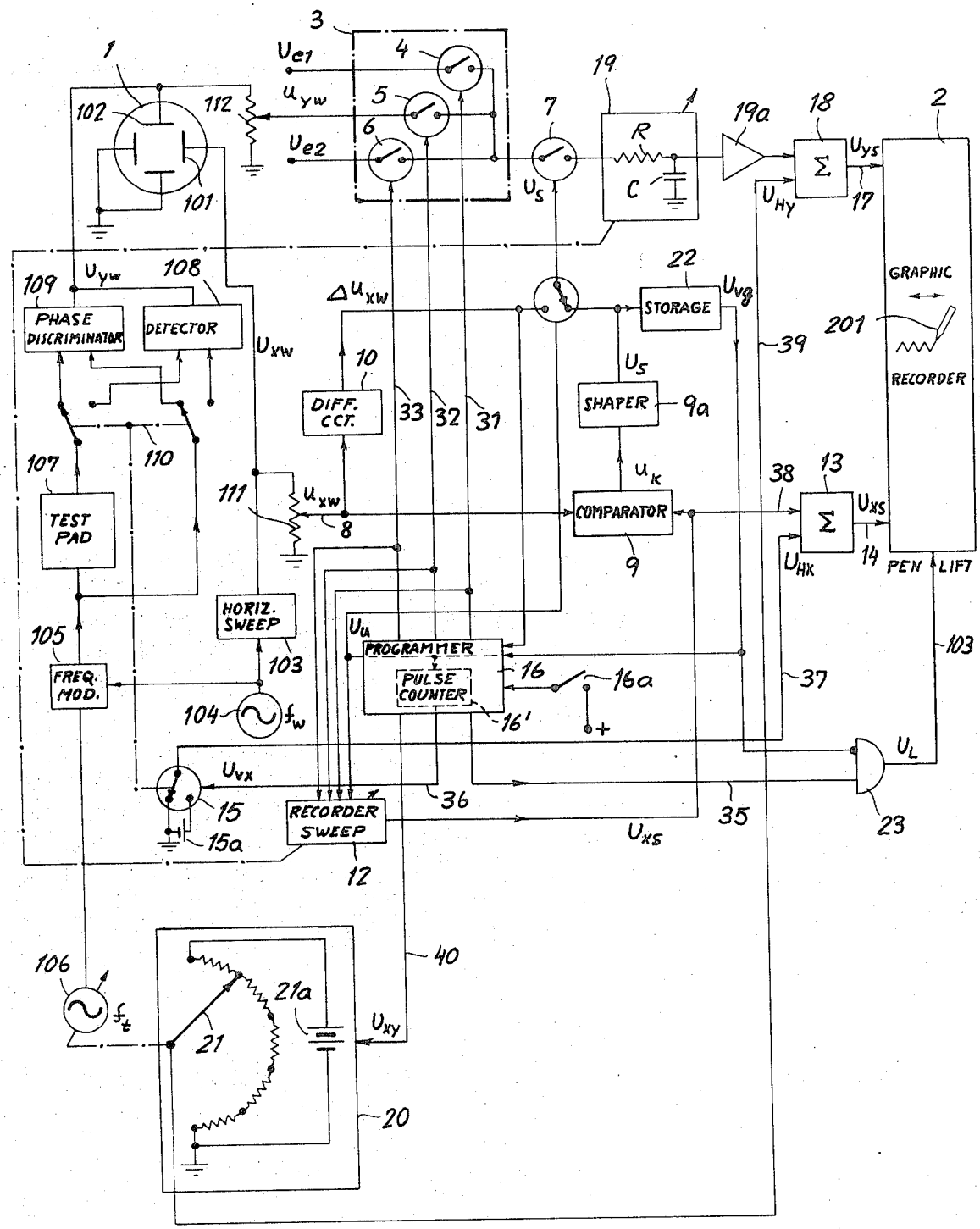
FIG. 1 is a circuit diagram of a display and recording system embodying our invention.

FIG. 1 shows an oscilloscope 1 and a graphic recorder 2 interconnected by a display converter according to our invention; the elements of this converter could be conveniently accommodated in a common housing to form a module which can be connected to respective terminals of the oscilloscope and the recorder without requiring internal changes in either of them.

Oscilloscope 1 comprises a conventional cathode-ray tube with horizontal and vertical deflecting electrodes 101, 102. Electrode 101 is periodically energized from a sweep circuit 103 with a triangular scanning voltage $U_{xw}'$, of relatively high frequency $f_w'$ under the control of a wobble-frequency oscillator 104 also feeding a frequency modulator 105. An oscillator 106, generating a test frequency $f_t$ which is variable in steps, works into the modulator 105 to produce a frequency-modulated oscillation traversing a test pad 107. The amplitudes of this oscillation at the input and the output of pad 107 are compared in a detector 108 measuring the attenuation introduced by the pad; in an analogous manner, a discriminator 109 determines the phase shift undergone by the test oscillation on its passage through the pad 107. A switch 110 alternately connects the output of test pad 107 to detector 108 and phase discriminator 109. Networks 108 and 109 constitute the source of a deflecting signal $U_{yw}$ applied to electrode 102.

Figure 2:
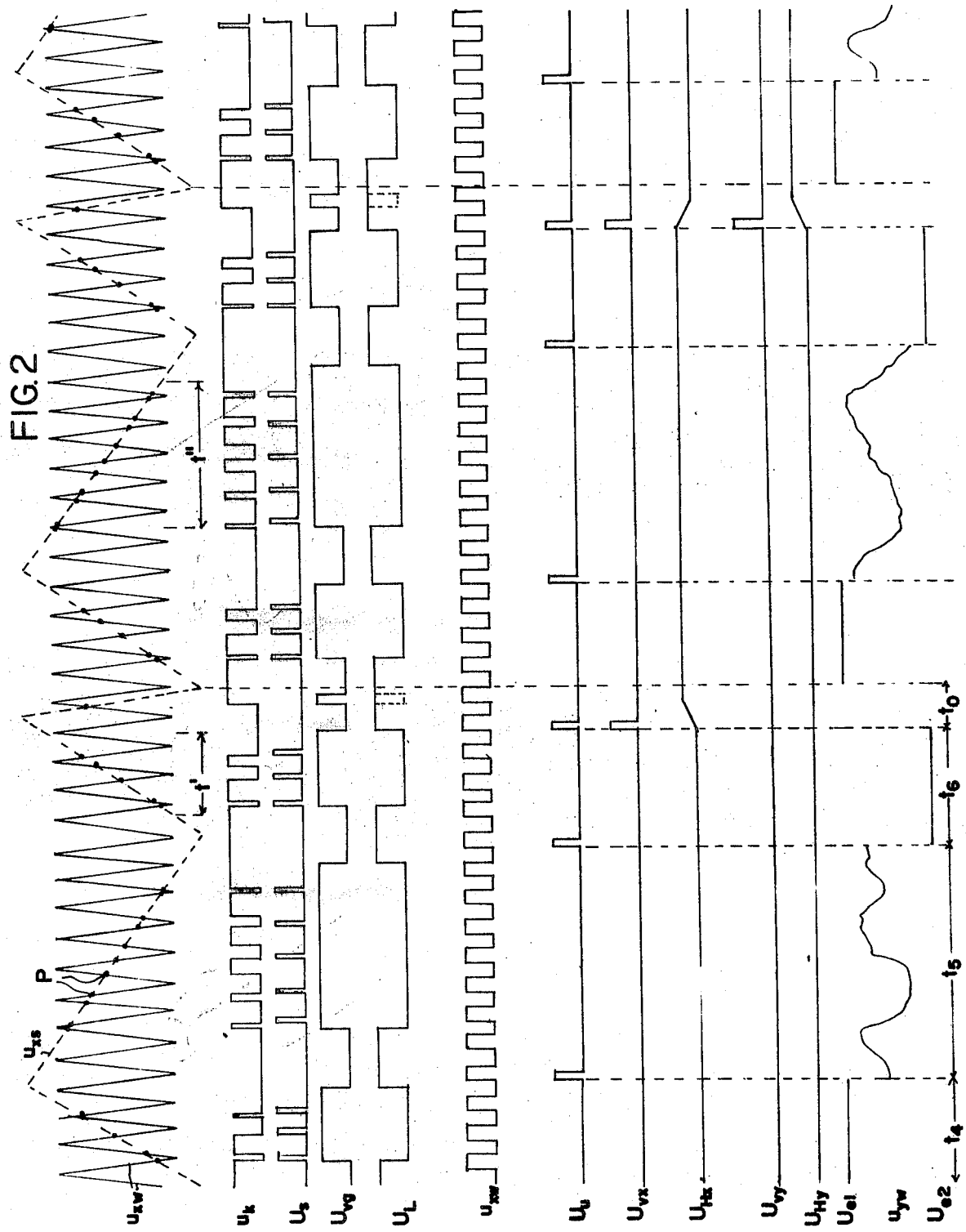
FIG. 2 is a set of graphs relating to the operation of the system of FIG. 1.

The elements so far described are entirely conventional, as is a sweep circuit 12 which generates a triangular voltage $u_{xs}$ of a frequency substantially lower than wobble frequncy $f_w$ giving rise to the horizontal-sweep voltage $U_{xw}$. A potentiometer 111 derives from the output of sweep generator 103 a fraction $u_{xw}$ of scanning voltage $U_{xw}$ and feeds it via a leed 8 to one input of a comparator receiving the low-frequency sweep voltage $u_{xs}$ from generator 12 on its other input. As shown in the top graph of FIG. 2, comparator 9 ascertains the points of intersection P of the two voltage curves $u_{xs}$ and $u_{xw}$ to generate a succession of coincidence signal $u_k$ (FIG. 2, second graph) whenever the voltage $u_{xs}$ lies within the swing range of voltage $u_{xw}$. In practice, the ratio of the two sweep frequencies is much higher than has been illustrated, for convenience, in FIG. 2. Furthermore, the sweep voltage $u_{rs}$ need not rise and fall linearly, as shown, but could follow a somewhat curved path without materially affecting the operation of the system.

Signals $u_k$ pass through a shaping circuit 9a deriving a succession of short voltage pulses $U_s$ (third graph of FIG. 2) from their descending flanks, these pulses $U_s$ occurring only in the wake of coincidences P between curve $u_{sx}$ and negative-slope portions of curve $u_{sw}$. Pulses $U_s$ are applied to one input (diagrammatically shown as a bank contact) of an ancillary switch 11 whose other input receives the output $\Delta u_{xw}$ of the differentiation circuit 10 connected to lead 8; this output $\Delta u_{xw}$ is a pulse train of constant cadence, coinciding with the descending flanks of voltage $u_{xw}$, as illustrated in the sixth graph of FIG. 2. Pulses $U_s$ are also delivered to a storage circuit 22 which includes a flip-flop, not shown, whose binary output $U_{vq}$ (fourth graph of FIG. 2) is of finite magnitude (here positive) whenever the pulses $U_s$ follow one another in rapid succession but goes to zero as soon as these pulses disappear for a small number of cycles of voltage $u_{xs}$ as determined by the time constant of the integrating part of storage circuit 22 ahead of its flip-flop. Thus, the absence of an output from storage circuit 22 indicates that the low-frequency sweep voltage $u_{sw}$ has either overshot or undershot the high-frequency sweep voltage $u_{xw}$. Through an inverting input of an OR gate 23, voltage $U_{vq}$ is also applied to ancillary input 103 of recorder 2 so that the pen-lifting magnet thereof operates whenever the sweep voltage $u_{sx}$ is out of range.

The switch 11, which like all the other switches here dislosed is of the electronic type, is connected to a control input of an electronic sampling gate 7 included in a pen-driving circuit which extends between oscilloscope electrode 102 and recorder input 17. This driving circuit includes a potentiometer 112 deriving from the deflecting voltage $U_{yw}$ a proportional fraction $u_{yw}$ fed to gate 7 through a switch 5 of a mode selector 3. Two other switches 4 and 6 of this mode selector may be alternately closed, in lieu of switch 5, to deliver either of two fixed reference voltages $U_{e1}$ (high) and $U_{e2}$ (low) to the gate 7. The voltages $U_{e1}$, $u_{yw}$ and $U_{e2}$ have been illustrated in the three bottom graphs of FIG. 2.

Switches 4, 5 and 6 are controlled by a programmer 16 in response to the output signal $U_{vq}$ of storage circuit 22, the programmer having a start switch 16a such as a pushbutton which can be manually closed for an instant to initiate the sequence of operations described hereinafter. Pulse train $\Delta u_{xw}$ from differentiator 10 is also supplied to programmer 16 for timing the output pulses of the programmer to coincide with or start at the negative flanks of sweep voltage $u_{xw}$. Programmer 16 has three output leads 31, 32, 33 respectively controlling the switches 4, 5, and 6 of mode selector 3 which operate in successive periods $t_4$, $t_5$ and $t_6$, followed by a fly-back period $t_0$ as shown at the bottom of FIG. 2. Leads 31–33 also extend to sweep generator 12 to modify the slope of its output voltage; thus, as likewise shown in FIG. 2, curve $u_{sx}$ has a large positive slope during OFF periods $t_4$, $t_6$ and a small negative slope during ON period $t_5$, traversing the swing range of voltage $u_{xw}$ in a relatively short time $t'$ on the upstroke and in a relatively long time $t''$ on the downstroke. At the end of each of these periods the programmer 16 emits a reversing command $U_u$ (seventh graph of FIG. 2) in the form of a short end-of-sweep pulse on a lead 34 extending to switch 11 and sweep generator 12; thus, switch 11 stands on its right-hand input during periods $t_4$, $t_6$ of rising sweep voltage and on its left-hand input during periods $t_5$, $t_0$ of falling sweep voltage. During period $t_0$, however, programmer 16 energizes an output lead 35 terminating at OR gate 23 so as to maintain the recorder pen 201 in its inoperative position. The pen-lift signal $U_L$ on lead 103 has been illustrated in the fifth graph of FIG. 2.

Figure 3:
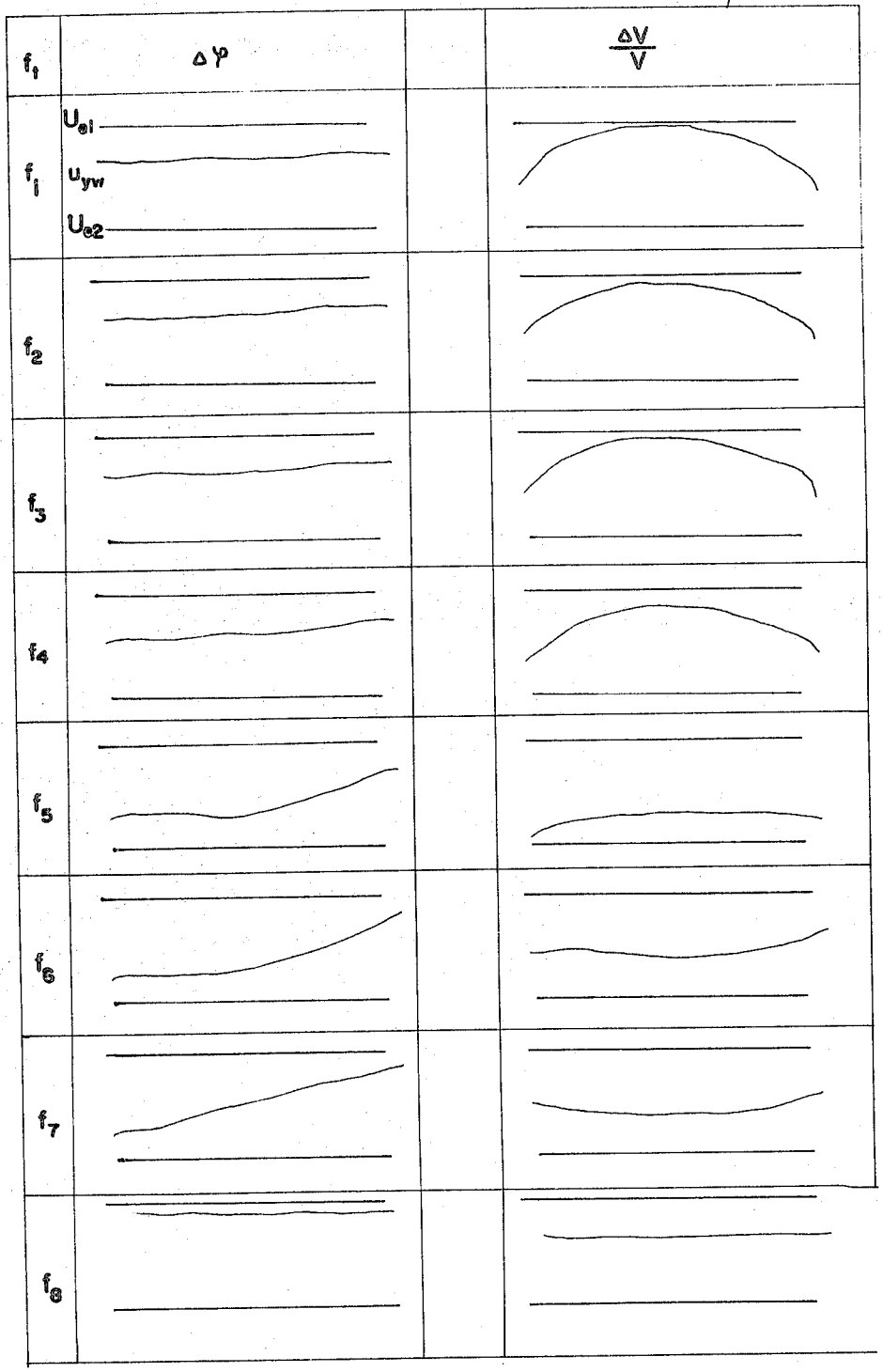
FIG. 3 illustrates a permanent record of attenuation and phase angles for different test frequencies as obtained from the system of FIG. 1.

The end-of-sweep pulses $U_u$ are applied within the programmer 16 to a pulse counter 16' which, upon every third of these pulses, generates a stop pulse $U_{vx}$ (eighth graph of FIG. 2) on a lead 36 terminating at a switch 15, the latter switch being ganged with the switch 110 in the output of test pad 107. Switch 15 has an output lead 37 terminating at a summing circuit 13 also receiving, via a lead 38, the sweep voltage $u_{xs}$ from generator 12; circuit 13 works into input 14 of recorder 2. In the illustrated starting position of switches 15 and 110, in which the deflecting voltage $U_{yw}$ for oscilloscope 1 is obtained from phase discriminator 109, lead 37 is grounded so that the output voltage $U_{xs}$ of summing circuit 13 is identical with its input voltage $u_{xs}$; thus, as illustrated in FIG. 3, the phase angle $\Delta\phi$ is traced in the left-hand half of recording paper 202. In the alternate switch position, in which the detector 108 feeds the deflecting electrode 102, a fixed supplemental voltage from a battery 15a on lead 37 is superimposed in the summer 13 upon the sweep voltage $u_{xs}$ to shift the pen to the right-hand half of the paper for recordal of the attenuation $\Delta V/V$. Summing circuit 13 and switch 15 together constitute, therefore, a voltage modifier in the horizontal input of recorder 2.

Another summing circuit 18 is inserted between the sampling gate 7 and the vertical input 17 of recorder 2. An accumulating network 19 with adjustable time constant, comprising a series resistor R and a shunt capacitor C, filters high-frequency noise from the signal $u_{yw}$ during ON periods $t_5$ and, as shown, may be ganged with sweep generator 12 for joint adjustment in the manner described above. Through an isolating amplifier 19a, network 19 feeds one input of summer 18 whose other input is connected via a lead 39 to a supplemental-voltage source 20. This source comprises a potentiometer 21, connected across a d-c supply 21a, which is adjustable in steps jointly with test-frequency oscillator 106 so as to impress upon lead 39 a stepped voltage whose steps coincide with the selection of different test frequencies $f_t$. The separation of these several test frequencies $f_t$, which in FIG. 3 have been designated $f_1 - f_8$, may be approximately equal to the frequency excursion introduced by modulator 105 so that successive frequency bands follow one another with little or no overlap. The voltage steps produced by potentiometer 21 are, of course, larger than the maximum swing of signal voltage $u_{yw}$ as modified by accumulator 19 and amplifier 19a. Thus, summer 18 produces an output voltage $U_{ys}$ which causes a vertical shift of pen 201 by a height of one row of the array of FIG. 3; together with source 20, this circuit constitutes a voltage modifier for the vertical recorder input.

The switchover from one frequency $f_t$ to the other with concurrent adjustment of potentiometer 21 is carried out by a pulse $U_{vy}$ emitted by the programmer 16 on a lead 40 upon the occurrence of every other stop pulse $U_{vx}$. The ninth, tenth and eleventh graphs of FIG. 2 respectively illustrate the supplemental voltage $U_{Hx}$ on lead 37, the stepping pulse $U_{vy}$ on lead 40 and part of the supplemental voltage $U_{Hy}$ on lead 39.

Programmer 16 may be so wired that, as illustrated in FIG. 3, the brief closure of start switch 16a establishes a position in which mode-selector switch 4 is open, sweep generator 12 produces a minimum output voltage (e.g., zero) and supplemental-voltage sources 15 and 20 ground the leads 37 and 39, respectively. With successive switchovers under the control of pulses $U_{vx}$ and $U_{vy}$, the reference levels $U_{e1}$ and $U_{e2}$ together with the traces $u_{yw}$ are recorded on paper 202 in an array of rectangular areas divided into two columns for parameters $\Delta\phi$ and $\Delta v/v$ as well as eight rows assigned to test frequencies $f_1 - f_8$.

In a semi-automatic system of the type described, an operator may manually perform the various switching functions upon observing the disappearance of signal $U_{vg}$ (e.g., as indicated by a monitoring lamp) which marks the end of a sweep.

FIG. 2 also shows that the application of signal $u_{yw}$ to accumulator 19 at the beginning of an ON period $t_s$ commences even before the reappearance of signal $U_{vg}$, i.e., while the writing implement 201 is still inoperative, so that this implement finds itself in the proper position to start tracing as soon as the pen-lift signal $U_L$ goes to zero.

We claim:

1. A system for making a permanent record of a variety of phenomena translatable into periodically recurrent deflecting signals for the beam of a cathode-ray tube, comprising:
   a cathode-ray-tube oscilloscope with a horizontal-sweep circuit connected to a source of high-frequency scanning voltage and with a vertical-deflection circuit connected to a source of said recurrent signals, said scanning voltage being synchronized with the recurrence rate of said signals;
   a graphic recorder provided with first input means for controlling the horizontal deflection of a writing implement and with second input means for controlling the vertical deflection of said implement across a recording medium;
   a generator of low-frequency sweep voltage;
   comparison means connected to said generator and to said horizontal-sweep circuit for emitting a coincidence signal upon the occurrence of a predetermined relationship between said high-frequency scanning voltage and said low-frequency sweep voltage;
   first circuit means connected to said generator for applying said low-frequency sweep voltage to said first input means;
   second circuit means controlled by said comparison means for establishing a connection between said vertical-deflection circuit and said second input means in response to said coincidence signal;
   a supply of supplemental voltage in at least one of said circuit means for modifying the energization of the associated input means of said recorder; and
   switchover means operable to alter the output of said source of recurrent signals concurrently with modification of the energization of said associated input means for successively inscribing replicas of different oscilloscope traces on different areas of said recording medium.

2. A system as defined in claim 1, further comprising storage means for said coincidence signal connected in the output of said comparison means for generating an end-of-sweep pulse upon prolonged absence of said coincidence signal.

3. A system as defined in claim 2, further comprising programming means controlled by said storage means for actuating said switchover means in response to said end-of-sweep pulse, said generator having a reversing input connected to said programming means for triggering thereby to alternate between increasing and decreasing sweep voltages in response to successive end-of-sweep pulses.

4. A system as defined in claim 3 wherein said programming means includes a counter for a predetermined series of n end-of-sweep pulses separated by alternating ON and OFF periods, further comprising a source of reference voltage and switch means in said second circuit means controlled by said programming means for connecting said source of reference voltage in lieu of said vertical-deflection circuit to said second input means during OFF periods, said switchover means being actuatable by a stop pulse from said programming means coinciding with every $n^{th}$ end-of-sweep pulse.

5. A system as defined in claim 4 wherein said supply of supplemental voltage includes a first voltage modifier in said first circuit means and a second voltage modifier in said second circuit means, said programming means being effective to step one of said voltage modifiers through an $m$-step cycle of successive stop pulses and to step the other of said voltage modifiers through a $p$-step cycle on every $m^{th}$ stop pulse whereby said writing implement is successively shifted across all the areas of an array of $p \cdot m$ areas of said recording medium.

6. A system as defined in claim 5 wherein said recurrent signals are derived from a plurality of voltage sources representing different parameters measured in the output of a test circuit with any of several input frequencies modulated in the rhythm of said high-frequency scanning voltage, said switchover means selecting $n$ different parameters concurrently with the stepping of said one of said voltage modifiers and selecting $m$ different input frequencies concurrently with the stepping of said other of said voltage modifiers.

7. A system as defined in claim 5 wherein said voltage modifiers include respective summing circuits.

8. A system as defined in claim 4 wherein said programming means is provided with a start switch for initiating the operation thereof in a position of said switch means connecting said source of reference voltage to said vertical-deflection circuit.

9. A system as defined in claim 4 wherein said second circuit means includes a sampling gate between said switch means and said second input means, said sampling gate being provided with an operating lead extending from said comparison means, and an ancillary switch in said operating lead controlled by said programming means for making the closure of said sampling gate independent of said coincidence signal during OFF periods.

10. A system as defined in claim 9 wherein said second circuit means further includes an accumulating network for pulses traversing said sampling gate, said sampling gate being periodically closable during OFF periods by constant-cadence pulses supplied thereto through said ancillary switch.

11. A system as defined in claim 9, further comprising a connection between said ancillary switch and said source of scanning voltage for deriving said constant-cadence pulses from the latter.

12. A system as defined in claim 11 wherein said connection includes a differentiation network.

13. A system as defined in claim 10 wherein said accumulating network comprises an R/C circuit with adjustable time constant.

14. A system as defined in claim 13 wherein said generator of sweep voltage is adjustable and ganged with said R/C circuit for varying the slope of said sweep voltage inversely with said time constant.

15. A system as defined in claim 4 wherein said counter establishes two OFF periods separated by one ON period during a series of three end-of-sweep pulses, with application of different reference voltages to said second input means by said switch means during said two OFF periods, said low-frequency sweep voltage having a slope of one sign during the OFF periods and a slope of the opposite sign during the OFF period whereby said implement moves across said recording medium in one direction during the OFF periods and in the opposite direction during the ON period, said stop signal causing a rapid change in the output voltage of said generator for quickly shifting said implement to a starting position.

16. A system as defined in claim 15 wherein said recorder has an ancillary input connected to said storage means for removing said implement from said recording medium upon prolonged absence of said coincidence signal.

17. A system as defined in claim 16 wherein said ancillary input is additionally connected to said programming means for continuous energization during the shift of said implement to said starting position.

18. A system as defined in claim 15 wherein the slope of said low-frequency sweep voltage is relatively high during the OFF periods and relatively low during the ON period.

* * * * *